Feb. 18, 1930.                    W. M. THOMAS                    1,747,194
                           THEFT PROTECTION FOR VEHICLES
                              Filed June 12, 1922          2 Sheets-Sheet 1
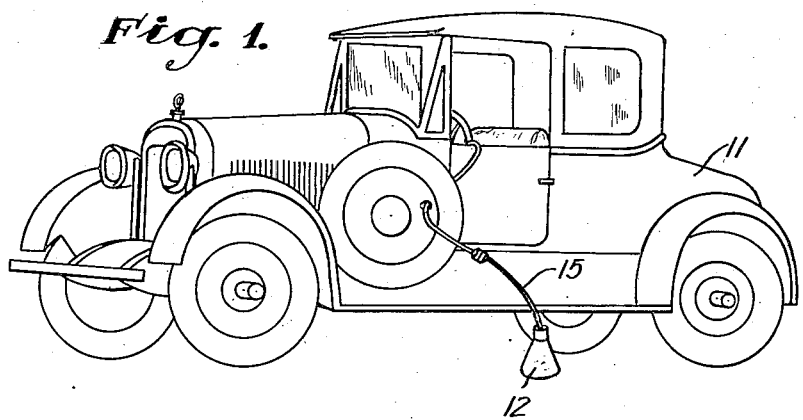
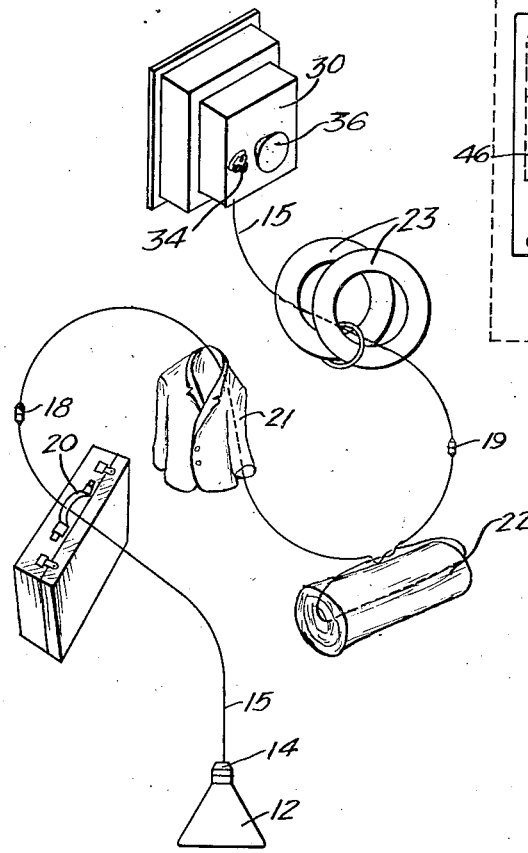
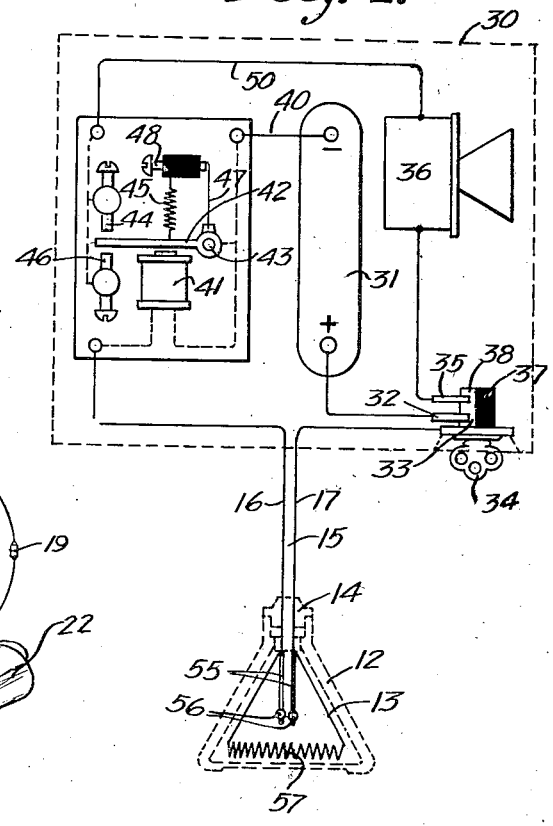
INVENTOR;
WILLIAM M. THOMAS,
BY
Graham Harris
ATTORNEYS.

Feb. 18, 1930.  W. M. THOMAS  1,747,194
THEFT PROTECTION FOR VEHICLES
Filed June 12, 1922   2 Sheets-Sheet 2
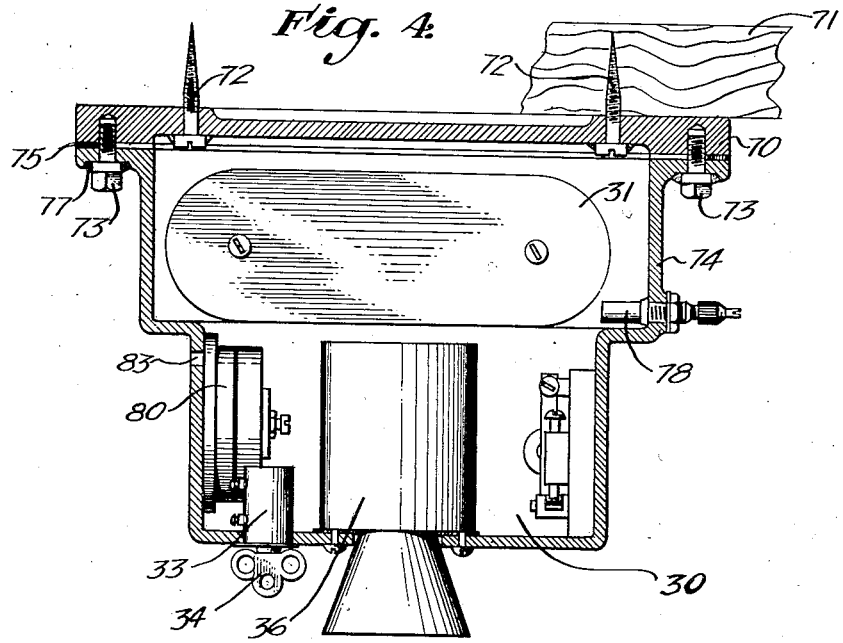
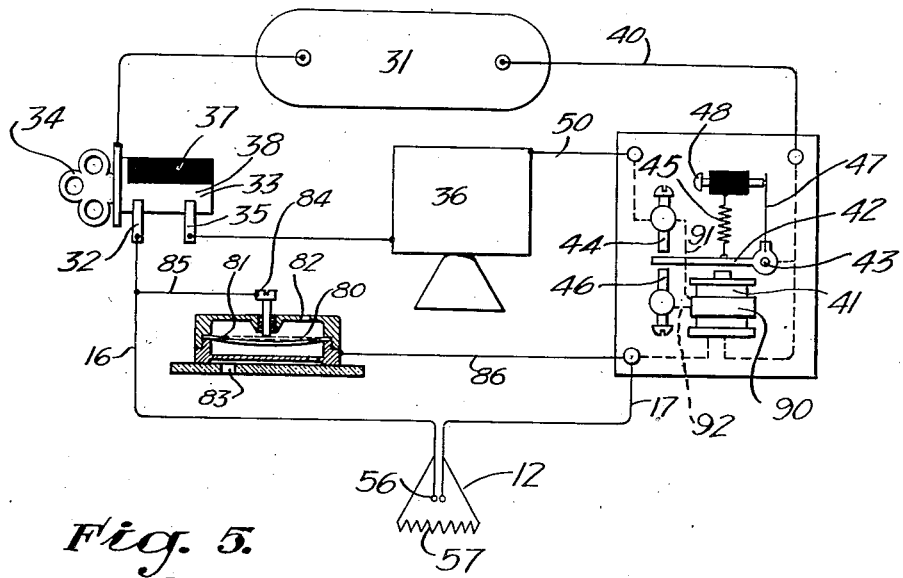
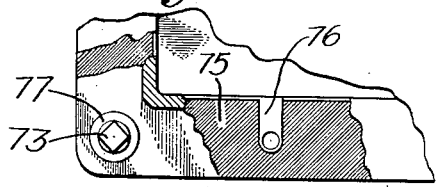
INVENTOR;
WILLIAM M THOMAS,
BY
ATTORNEYS.

Patented Feb. 18, 1930

1,747,194

UNITED STATES PATENT OFFICE

WILLIAM M. THOMAS, OF LOS ANGELES, CALIFORNIA, ASSIGNOR TO LE ROY THOMAS, OF LOS ANGELES, CALIFORNIA

THEFT PROTECTION FOR VEHICLES

Application filed June 12, 1922. Serial No. 567,548.

My invention relates to the art of protecting a vehicle and its contents against the depredation of thieves, and it is particularly applicable to automobiles. Automobile thefts have greatly increased in recent years, due partly to the fact that automobiles have a relatively high value, are moved by their own power and may be operated by an unauthorized person. Consequently, there is a demand for a protective device which will effectually prevent thefts. There is also a very great demand for a device which will protect spare tires, suit cases or clothing left in such an automobile from the depredation of thieves.

A successful theft protector for automobiles must have certain qualities. In the first place, it must be so constituted that the automobile may be moved through limited distances in case it is necessary to do so in the absence of the owner and must be so constituted that the automobile may be driven by an authorized person such as a police officer any desired distance in the absence of the owner in the event that this becomes necessary, as, for example, in case of fire. Such a theft protector must, however, protect the car from being driven by a thief or transported by a so-called wrecking crew by the use of trucks, dollies or other devices.

The theft protector must also be so constructed that in the event the owner attempts to drive the car with the theft protector in service, no serious harm will result. The theft protector must also be so constituted that it cannot be put out of service by thieves except by the expenditure of a considerable amount of time and energy. My invention conforms to all these requirements.

Further objects and advantages will be made evident hereinafter.

Referring to the drawing, which is for illustrative purposes only,

Fig. 1 is a perspective view of an automobile having my invention applied thereto.

Fig. 2 is a diagrammatic representation of the invention.

Fig. 3 is a diagrammatic representation of the method of using the invention to protect spare tires, suit cases or other luggage or clothing, and Fig. 4 is a cross section through a preferred embodiment of signal box.

Fig. 5 is a fragmentary view of same.

Fig. 6 is an alternate diagram of connections.

In the form of the invention shown, 11 is an automobile which it is desired to protect against thieves. For this purpose, I provide a member 12 which is movable with relation to the automobile 11 and which is preferably made of steel. In the form shown, this member has a hollow cavity 13 closed by a cap 14 which may be welded or otherwise permanently secured in place so that access cannot be had to the interior of the member 12 without the use of tools and the expenditure of considerable time and effort. Secured in the cap 14 and passing therethrough is a conductor 15 consisting of two wires 16 and 17. This conductor may be provided with standard plugs 18 and 19 designed to permit the conductor 15 to be broken apart so that it may be passed through the handle of a suit case 20, the sleeve of a coat 21, through the center of a roll of baggage 22 or through spare tires 23.

The conductor 15 passes into and is secured in a metal box 30 which is permanently secured to the automobile at any convenient point. The box 30 is preferably formed of steel and is so constructed and secured to the automobile that it cannot be opened or removed from the automobile except by the expenditure of a large amount of time and energy even with the use of suitable tools. Situated inside the box 30 is a battery 31 having its positive terminal connected to a brush 32 of a rotating member 33 which is actuated only by a suitable key 34 which may be inserted from the exterior of the box 30 for the purpose of turning the member 33. A second brush 35 is also provided bearing on the member 33, this brush being connected to one terminal of a horn or other signal 36. The member 33 comprises an insulating member 37 and a conducting member 38, the member 38 being grounded to the frame of the box to which the wire 17 is also attached. The negative terminal of the battery 31 is connected through a wire 40 with a magnet coil 41 and with an insulated arm 42 which is pivoted on a pin 43. This arm is pulled back against a screw 44 by means of a spring 45 in the event that there is no current in the magnet 41 and may be pulled against a screw 46 against the action of a flat spring 47 in the event that the magnet 41 is energized with nearly the full strength of the battery 41. The flat spring 47 bears against a screw 48 which is adjusted to hold the member 42 centrally between the screws 44 and 46 whenever the current in the magnet 41 is below a certain definite amount. The screws 44 and 46 are connected through a wire 50 with the other terminal of the horn 36, the other terminal of the magnet being connected to the wire 16.

Freely suspended in the chamber 13 by means of flexible conductors 55, which are connected to the wires 16 and 17 respectively, are metal balls 56 which are out of contact with each other when allowed to hang freely with the member 12 in stationary position. A resistance 57 is connected between the wires 16 and 17 inside the member 12.

The method of operation of the invention is as follows:

With the brushes 32 and 35 resting on the insulating member 37, the positive terminal of the battery is entirely disconnected from the remainder of the mechanism so that the signal device is inoperative. When it is desired to put the signal into its operative position, the member 33 is turned by means of the key 34 which is then withdrawn, the member 33 being turned a sufficient amount to connect the brushes 32 and 35 through the member 38 with the wire 17. Current will then flow from the positive terminal of the battery through the wire 17 and through the resistanec 57, returning through the wire 16 and the coil 41 to the negative terminal of the battery. The resistance 57 is so proportioned with relation to the winding of the coil 41 that a small current will flow in the winding 41, this current being sufficient to pull the member 42 away from the screw 44 against the action of the spring 45. The screw 48 is adjusted, however, so that the flat spring 47 strikes on the screw 48 before the member 42 can make contact with the screw 46. This results in the member 42 assuming the position shown in Fig. 2, thus opening the circuit from the battery to the screws 44 and 46.

In the event that the circuit through the wires 16 and 17 is opened either by cutting these wires or by breaking the connection at 18 or 19, the circuit through the coil 41 is broken and the spring 45 acts to move the member 42 into contact with the screw 44, thus closing the circuit through the wires 40 and 50 from the negative terminal of the battery to the signal 36 which is immediately actuated. The signal 36 is preferably an electric horn giving a sharp and unmistakable warning which will continue as long as the member 42 rests against the screw 44 and the member is in its operative position. This warning signal of the horn serves to notify the public and to notify the police officers that there is something wrong with the car and that the signalling device has been tampered with. In the event that the wires 16 and 17 are joined together, which could be accomplished by cutting through the insulation and placing a jumper thereon, it is obvious that the wires 16 and 17 might be cut beyond the jumper without opening the circuit. The placing of this jumper across the wires 16 and 17 completely short circuits the resistance 57, however, and results in a large flow of current through the magnet 41, this flow of current being sufficient to pull the member 42 against the screw 46. This completes the circuit from the battery through the wires 40 and 50 to the signal 36 and the signal will continue to function until such a time as the jumper is removed. Thus, if the current flowing through the wires 16 or 17 is increased by the placing of a jumper which would cause a circuit, or is broken by cutting the wires, the signal immediately starts to function. The adjustment of the springs 45 and 46 can be made sufficiently delicate to operate on very small variations in current.

In practice, the member 12 is taken from the automobile and placed upon the pavement previous to throwing the switch 33 to render the signal operative. The conductor 15 is made of sufficient length to allow the car to be moved any desired distance, say about ten feet. This allows the car to be moved to enable other cars to be taken in or out, this movement not resulting in any actuation of the signal 36. If the member 12 is disturbed, the movement of this member results in the balls 56 striking together and closing the circuit through the coil 41 so that the member 42 is pulled against the screw 46. The result is that the signal sounds whenever these balls strike each other which will occur in the event that the automobile is driven due to the natural movement of the automobile over the street. The members 56 are separated by a very small distance and a very small movement of the member 12 will serve to bring them together. It is impossible, except by the exercise of such care and precision as to betray his intent, for a thief to pick the member 12 up and place it in the car without actuating the signal. At the same time, it is possible for a police officer or for the owner in an emergency to operate the car. If the car is so operated the signal 36 will of course sound until such a time as the member 33 is turned by the use of the key 34.

For the purpose of further safe-guarding the invention, I utilize the form of box shown in Fig. 4 in which 70 is a base plate which is secured to the frame 71 of the automobile by screws 72 which are entirely inside the box and which are sealed in place by some suitable air tight sealing compound. Secured to the base 70 by means of bolts 73 is a one piece box 74. A gasket 75 is provided between the base 70 in the box 74, this gasket being cut out, as shown in Fig. 5 at 76, so that a space is left around each of the bolts 73 which is in open communication with the interior of the box. The bolts 73 are sealed by a suitable compound 77. The interior of the box is filled with air under pressure through a tire valve 78, it being the intention of the invention to maintain the interior of the device under pressure at all times. Secured in one side of the box is a diphragm chamber 80 containing a diaphragm 81, one side of which is acted upon by the pressures inside the box through a hole 82, the other side of the diaphragm being acted upon by atmospheric pressure through a hole 83. A screw 84 insulated as shown is connected through a wire 85 with one of the wires 16 and through the casing of the diaphragm chamber 80, being connected through a wire 86 with the wire 17.

As long as the pressure inside the box considerably exceeds atmospheric pressure, the diaphragm 81 is held out of contact with the screw 82. If, however, the pressure inside the box falls to an atmospheric pressure, the diaphragm 81 touches the screw 84 and a short circuit is established between the wires 16 and 17 which sets off the signal 36 in the manner previously described. By maintaining a pressure on the interior of the device, the possibility of its being rendered inoperative by being tampered with is very greatly reduced. In the event that any of the screws 73 are removed, air escapes through the opening 76 and the vacant bolt hole and the consequent fall in air pressure immediately starts the signal.

A further feature of the device shown in Fig. 6 is that after the member 12 has been moved so as to cause the contact of the balls 56, the siren will operate continuously until shut off by turning the lock switch. This continuous operation is accomplished by a secondary coil 90 which is wound upon the magnet 41 and connected to the screws 44 and 46 by conductors 91 and 92. When the bar 42 is drawn down, due to the flow of a strong current through the magnet 41, the secondary circuit in which the signal 36 is connected is closed by the contact of the bar 42 with the screw 46 from which the current flows through the conductor 92, the secondary coil 90, and through conductor 91, thus sustaining the attraction of the bar 42 by the magnet 41 even though the balls 56 should separate and break the circuit which energizes the magnet 41.

I claim as my invention:

1. In an alarm device of the character described, the combination of: an alarm device including a source of electric energy; an anchor member; a pair of electric conductors extending to said anchor member; a flexible housing for said conductors; a resistor in said anchor member connnecting between said conductors; contact means in said anchor member arranged to close between said conductors in event of movement of said anchor member; and means included in said alarm device for actuating said alarm device when the flow of current through said conductors is changed by the closing together of said contact means.

2. In an alarm device of the character described, the combination of: an alarm device including a source of electric energy; an anchor member; a pair of electric conductors extending to said anchor member; a flexible housing for said conductors; a resistor in said anchor member connecting between said conductors; contact means in said anchor member arranged to close between said conductors in event of movement of said anchor member; and means included in said alarm device for actuating said alarm device, such means, said conductors, and said resistor being included in a closed circuit energized from said source of electric energy, thereby actuating said alarm device when the flow of current through said conductors is changed by the closing together of said contact means, or when said closed circuit is broken.

3. In a burglar alarm of the class described the combination of: a housing; an alarm device situated in said housing and including an alarm and an alarm operating means; an anchor; flexible electrical conductors connecting said anchor and said housing together, an electric control device for said operating means, said control device and said conductors forming a closed control circuit for said alarm control device; an electrical source in said housing, supplying an electric current carried by said closed control circuit, said control device being responsive only to a changed current flow in said control circuit; and means for causing said current to change when the said anchor is moved in order to actuate said alarm control device.

4. In a burglar alarm of the class described, the combination of: an alarm; an alarm circuit for said alarm; a switch in said alarm circuit, said switch being normally open; a normally closed control circuit; means in said control circuit responsive to variation in the flow of current in said control circuit for closing said switch; an anchor to which said normally closed control circuit extends; and means in said anchor responsive to movement thereof for varying the flow of current in said closed circuit.

5. In a burglar alarm of the class described, the combination of: a housing; an alarm device situated in said housing and including an alarm and an alarm operating means; an anchor; flexible electrical conductors connecting said anchor and said housing together; an electric control device for said operating means; a resistance in said anchor, said control device, said conductors and said resistance forming a closed control circuit for said control device, said control device being responsive only to a changed current flow in said control circuit; an electrical source in said housing, supplying an electric current carried by said closed control circuit; and means in said anchor for cutting said resistance out of said control circuit when the anchor is moved, in order to vary the current flow so as to operate said electric control means in a manner to effect an operation of said alarm operating means.

In testimony whereof, I have hereunto set my hand at Los Angeles, California, this 5th day of June, 1922.

WILLIAM M. THOMAS.